March 20, 1956    O. SKJAERPE ET AL    2,738,601
LAND-CLEARING PLOW ATTACHMENT
Filed Feb. 5, 1952

INVENTORS
Odd Skjærpe
Ragnvald Skjærpe
BY
ATTORNEYS

UNITED STATES PATENT OFFICE 2,738,601
Patented Mar. 20, 1956

2,738,601

LAND-CLEARING PLOW ATTACHMENT

Odd Skjaerpe and Ragnvald Skjaerpe, Naerbo, Norway, assignors to F. A. Underhaugs Fabrik, Naerbo, Norway Application February 5, 1952, Serial No. 269,934

Claims priority, application Norway February 24, 1951

2 Claims. (Cl. 37—2)

This invention relates to improvements in bulldozer equipped tractors including an improved bulldozer attachment especially adapted for clearing land that has not been previously cleared or cultivated and for performing other heavy specialized work.

Bulldozers have been employed in the clearing of land, more particularly by using a scraper type blade for uprooting small trees and brush which are pushed along the surface of the ground to a collection point. However, tractors which are merely equipped with a scraper type blade or equivalent attachments are unsuitable for clearing rugged ground which is full of stones or roots or which has a very hard natural crust which cannot be broken by the usual type of scrapers or plows. Rugged ground of this type is either cleared by manual operation or is left uncleared because of the time and energy required to uproot heavy stones and large tree stumps. Large areas of land, which would otherwise be valuable for growing crops are left uncleared because of the foregoing difficulties.

The primary object of the present invention is, therefore, to provide a land-clearing tractor which is suitable for clearing rugged ground, that is, ground which may be full of heavy stones and tree roots or which cannot be broken by the use of common type plows.

According to the features of the present invention, the various difficulties and disadvantages of previously known equipment are avoided and the problem of clearing rugged land is solved by providing a special type plow at the front end of a tractor and to one side of the traction elements of the tractor, the plow being so constructed and arranged that it will probe deeply into the ground and throw out heavy stones and tree roots and deposit them out of the path of the tractor.

Tractor-operated plows heretofore employed, in which a plow is drawn behind the tractor, are unsatisfactory for clearing land of the type described above because the tractor must at least in part move on plowed ground, or in the furrow made by the plow, and the fact that a trailing plow has a tendency to shift sideways when it comes in contact with a root or stone of any considerable size. In general, such plows will not overturn large stones or throw them up onto the surface of the ground. On the other hand, the tractor of the present invention has proved its effectiveness in clearing land, for example, a bulldozer tractor unit constructed in accordance with the invention and weighing fifteen tons will easily cut a furrow 60 cm. or 2 feet in depth having a width of 1 meter (over 3 feet), and throw out stones weighing as much as several tons.

The land-clearing tractor of the present invention includes a land-clearing plow implement located at the front end of the tractor proper and to one side thereof in order to obtain a butting or rooting action, and at the same time make it possible to keep the wheels or treads of the tractor on uncleared land. In accordance with the invention, the plow implement is attached to the usual hydraulically-controlled implement-carrying beam which extends in an adjustable manner transversely of the front end of the tractor.

The unsymmetrical disposition of the plow or clearing implement in relation to the tractor proper of necessity provides a component of force that tends to turn or swing the tractor from its directed course. This turning moment may, however, be largely eliminated by the transversely directed component of force which is created by the particular structure of the plow implement in overturning earth, stones, or roots in making a furrow. The plow is preferably positioned with respect to the tractor so that these forces which act in opposite directions in relation to the center of the tractor or its path of movement, will during normal conditions of operation largely if not completely counterbalance or eliminate each other.

An important feature of the invention is, therefore, to mount the clearing implement in such a position that the resultant force component of the two forces referred to will pass substantially through the longitudinal center of the tractor, in other words, so that those forces will balance each other. It has been found that this result may be achieved at least in part, particularly with respect to the transverse force component, by inclining the land-side of the plow upwards and rearwards, so that it presents a minimum of surface abutting against the land-side of the furrow made by the plow.

The improved land-clearing tractor of the present invention includes other features which will become apparent from the following more detailed description thereof in connection with the accompanying drawings forming a part of this application and which illustrate an exemplary embodiment.

Figure 1:
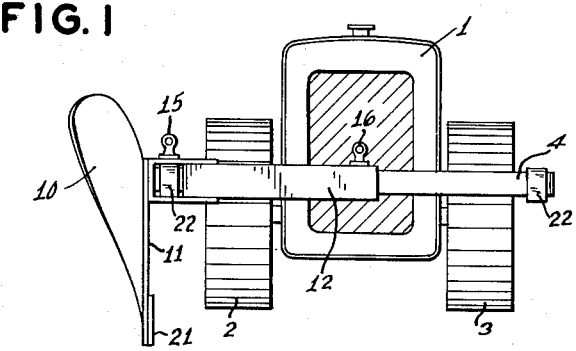
Fig. 1 is a front view of a bulldozer-equipped land-clearing tractor constructed in accordance with the features of the present invention.

Referring to the drawings, the features of the present invention are illustrated in connection with a conventional type of caterpillar tractor 1 provided with tractor treads 2 and 3 which are mounted and arranged in the usual manner for operating the tractor. The tractor also includes the usual front implement-carrying beam 4, connected to and carried by hydraulically controlled side beams 5 and 6 pivoted and anchored to the tractor at 7 and 8, respectively. The hydraulic means for adjusting the vertical position of the beam 4 and for elevating and lowering the implement carried thereby is not shown in the drawings, since such equipment is conventional and commonly known.

In accordance with the invention, the tractor 1 is provided at its front end and to the outside of the line of the tread 2 with a land-clearing plow attachment 9. This plow attachment comprises a plow share 10 attached to a shearing member 11 mounted in fixed position on the end of an attachment beam 12. The beam 12 is fixed to the upper end of the shearing member 11 and extends at right angles thereto. The beam 12 is constructed substantially as shown of channel units and provided with holes 13, 14 for receiving attachment bolts 15 and 16 adapted to pass through corresponding attachment holes provided on attachment elements of the beam 4.

In the land-clearing plow unit as described, the shearing member 11 is made of very heavy steel stock and its side opposite the moldboard or share 10 comprises the land-side of the unit which slopes upwardly and rearwardly from its probing point 17. The upper sloping edge 18 is arranged at the proper angle to shear off roots or the ground being cleared, while the lower edge 19 also slopes upwardly and rearwardly so that the point 17 is much lower in the ground than the end of the edge 19 so that there is a relatively small part of the surface of the shearing plate 11 in contact with the land-side of the furrow made by the plow unit.

The forward upwardly and rearwardly-sloping edge of the moldboard or share 10 is blended into the surface of the shearing member 11 and attached thereto by welding or bolting, and held in the position shown with respect to the shearing member 11 by means of brackets, some of which are shown at 20. The forward end of the share 10 terminates in a point at the forward point 17 of the shearing member 11 and is provided with upper and lower upwardly and rearwardly-extending edges which follow generally the angle of the edges 18 and 19 of the shearing member 11, the upper edge following nearly all the way along the edge 18, while the lower edge extends in the same plane as the edge 19 but at a spreading angle with respect thereto, as will be apparent in the showing in Fig. 2. The land-side of the shearing member 11 is reinforced to the point 17 by an attached bar 21 which includes an upper sloping surface in the plane of the edge 18.

The U-shaped frame comprising the elements 4, 5, and 6, which carries the land-clearing plow unit, is provided with forwardly-projecting attachment elements 22 and 23 each provided with end holes for receiving bolts such as the bolts 15 and 16. The attachment elements 22, respectively, project forward in line with the beams 5 and 6 and the element 23 projects from the center of the beam 4 so that the holes in the ends of the elements 22 and 23 are in a line at 90° to the center line of the tractor. The attachment beam 12 of the plow unit comprises a U-shaped channel member 24, the web of which is fixed to the upper side portion of the shearing plate 11, while the laterally projecting sides are provided with holes 13. These laterally projecting sides are fixed to one end of a rearwardly facing channel member comprising the greater part of the beam 12, the other end of which is provided with the holes 14.

In assembling the plow attachment onto the tractor, the member 22 attached to the beam 6 is inserted in the box-like channel 24 and the pin 15 inserted through the hole 13 and the hole in the end of the member 22. The inner end of the channel 12 receives the member 23 between the upper and lower portions of the channel and the bolt 16 is inserted through the holes 14 and the hole in the member 23. In this manner the bulldozer attachment unit is rigidly secured to the tractor frame.

From the foregoing description, it will be understood that the improved results obtained in accordance with the present invention stem from the special structure of the land-clearing plow unit, its manner of attachment to the tractor and its special positioning and orientation with respect to the tractor, so that the transverse and longitudinal components of force combine to form a force component extending through the longitudinal center of the tractor. Because of these features and the arrangement and structure of the plow unit, the tractor is adapted to operate normally and smoothly at full efficiency, even though the plow attachment member is arranged in an unsymmetrical position with respect to the tractor. Furthermore, by placing the plow attachment unit in front and to one side of the tractor proper, the tractor treads may be operated upon uncleared solid ground to the side of the deep wide furrow made by the plow unit and the tractor is much more maneuverable than a tractor provided with a trailing plow. With the land-clearing plow attachment mounted to one side and in front of the tractor, and arranged in accordance with the invention, the operator is able to determine at a glance the proper change in elevation or position of the plow unit and to maneuver the tractor or the plow unit or both in view of the presence of large roots or heavy stones along the path of movement of the land-clearing unit. These operations are readily carried out by the operator because the tractor is operating on solid uncleared land and not tilted or restrained by the wide deep furrow made by the land-clearing unit on a previous round or run.

Figure 2:
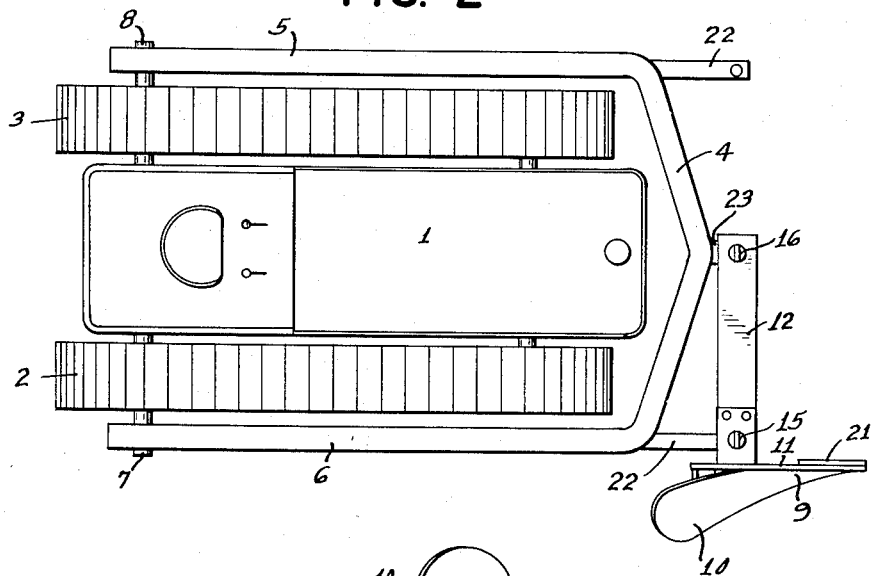
Fig. 2 is a plan view of the bulldozer-equipped land-clearing tractor shown in Fig. 1.
Figure 3:
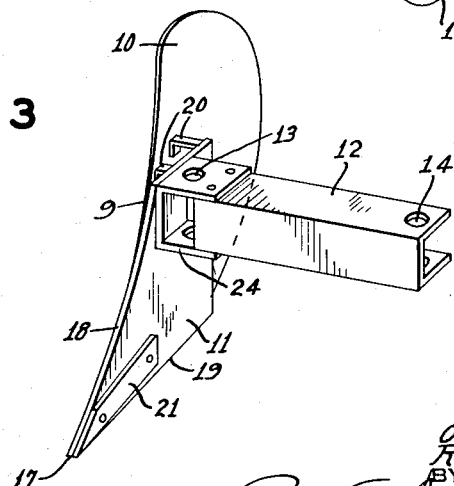
Fig. 3 is a perspective view of a bulldozer land-clearing attachment constructed in accordance with the present invention.

Since the plow share 10 has a substantially wide path, as shown in Figs. 1 and 2, any stone or root elevated by the shearing member 11 will be rolled off to the right to a position on top of the ground ready for removal from the land being cleared.

We claim:

1. In a land-clearing plow unit for attachment to a tractor provided with a generally U-shaped frame having a front beam at the front of the tractor and arms extending respectively along the sides of the tractor proper, the front end of the frame being adapted to be raised and lowered, the plow unit being adapted to uproot tree stumps and stones including a laterally-extending channel iron attachment beam detachably securable to the front of the tractor frame and projecting to one side of the tractor proper at the front thereof, a member projecting forwardly from the U-shaped frame respectively at the center and sides of the frame, means for detachably securing the inner end of the attachment beam to the center member, means for detachably securing the outer end portion of the attachment beam to one of the members projecting forwardly from the sides of the frame, a heavy steel plate shearing member fixed to the end of the laterally-extending attachment beam of the plow unit projecting to one side of the tractor proper, said shearing member having downwardly and forwardly-extending upper and lower edges converging to a point providing a probing point for the plow unit, said probing point being forward of and below the position of the projecting end of the attachment beam fixed to the shearing member, and a moldboard mounted on the outside of the shearing member for directing uprooted tree stumps and stones away from the path of the tractor, said shearing member and moldboard being located in front of and to one side of the tractor proper when the plow unit is attached thereto whereby the tractor is operable on uncleared solid ground to one side of the furrow made by the shearing member.

2. In a land-clearing plow unit for attachment to a tractor provided with a generally U-shaped frame having a front beam at the front of the tractor and arms extending respectively along the sides of the tractor proper, the front end of the frame being adapted to be raised and lowered, the plow unit being adapted to uproot tree stumps and stones including a laterally-extending attachment beam detachably securable to the front of the tractor frame and projecting to one side of the tractor proper at the front thereof, a heavy steel plate shearing member fixed to the end of the laterally-extending attachment beam of the plow unit projecting to one side of the tractor proper, said attachment beam including a U-shaped member having its back fixed to the inside surface of the shearing member and an elongated channel member one end of which is fixed to the arms of said U-shaped member with its open side facing toward the rear, said shearing member having downwardly and forwardly-extending upper and lower edges converging to a point providing a probing point for the plow unit, said probing point being forward of and below the position of the projecting end of the attachment beam fixed to the shearing member, and a moldboard mounted on the outside of the shearing member for directing uprooted tree stumps and stones away from the path of the tractor, said shearing member and moldboard being located in front of and to one side of the tractor proper when the plow unit is attached thereto whereby the tractor is operable on uncleared solid ground to one side of the furrow made by the shearing member.

(References on following page)

References Cited in the file of this patent

UNITED STATES PATENTS

| | | |
|---|---|---|
| 490,420 | Wolke | Jan. 24, 1893 |
| 836,007 | Bippart | Nov. 13, 1906 |
| 1,361,638 | Stephenson | Dec. 7, 1920 |
| 2,437,176 | Taylor | Mar. 2, 1948 |
| 2,465,660 | Phillips | Mar. 29, 1949 |
| 2,582,538 | Flynn | Jan. 15, 1952 |
| 2,587,721 | Garnsey et al. | Mar. 4, 1952 |
| 2,626,468 | Dobrinich | Jan. 27, 1953 |

FOREIGN PATENTS

| | | |
|---|---|---|
| 373,319 | Germany | June 9, 1921 |